United States Patent [19]

Wiley

[11] 4,236,113

[45] Nov. 25, 1980

[54] ELECTRICAL WELL LOGGING TOOL, HAVING AN EXPANDABLE SLEEVE, FOR DETERMINING IF CLAY IS PRESENT IN AN EARTH FORMATION

[75] Inventor: Bruce F. Wiley, Bartlesville, Okla.

[73] Assignee: Phillips Petroleum Company, Bartlesville, Okla.

[21] Appl. No.: 896,061

[22] Filed: Apr. 13, 1978

[51] Int. Cl.³ .................... E21B 23/00; G01V 3/24
[52] U.S. Cl. ....................... 324/366; 166/113; 166/187; 324/367
[58] Field of Search .......... 324/1, 9, 10, 13, 366, 324/367; 166/187, 250, 113

[56] References Cited

U.S. PATENT DOCUMENTS

| | | | |
|---|---|---|---|
| 2,176,169 | 10/1939 | Doll | 324/10 |
| 2,400,678 | 5/1946 | Archie | 324/1 |
| 2,750,557 | 6/1956 | Bricaud | 324/10 |
| 2,786,178 | 3/1957 | Doll | 324/10 X |
| 2,799,004 | 7/1957 | Thompson | 324/10 X |
| 2,823,349 | 2/1958 | French | 324/10 |
| 2,930,969 | 3/1960 | Baker | 324/10 |
| 2,988,690 | 6/1961 | Love et al. | 324/1 |
| 3,065,405 | 11/1962 | Jarrett | 324/1 |
| 3,207,981 | 9/1965 | Marsh et al. | 324/65 |
| 3,219,921 | 11/1965 | Bricaud | 324/1 |
| 3,243,695 | 3/1966 | Roark et al. | 324/13 |
| 3,405,351 | 10/1968 | Schuster | 324/10 |
| 3,876,003 | 4/1975 | Kisling | 166/187 X |
| 3,902,113 | 8/1975 | Bridges et al. | 324/10 |
| 3,967,190 | 6/1976 | Zonge | 324/9 |
| 3,971,437 | 7/1976 | Clay et al. | 166/187 |
| 3,995,694 | 12/1976 | Freiburger | 166/187 X |
| 4,063,427 | 12/1977 | Hoffman | 166/187 X |
| 4,117,394 | 9/1978 | Souhaité | 324/10 |

Primary Examiner—Gerard R. Strecker

[57] ABSTRACT

An electrical well logging system is disclosed wherein the well logging tool is enclosed at least in part by an expandable sleeve having a band of electrodes located in the outer surface thereof. The band of electrodes is located in a plane which is perpendicular to the vertical axis of the well logging tool. When the well logging tool is in a desired position in the borehole, the expandable sleeve is expanded to place the electrodes located therein in contact with the adjacent sidewall surface of the borehole. Current is injected into the formation surrounding the borehole and the voltage induced by the current is measured. A phase comparison of the current injected into the formation and the voltage sensed in response to the injected current can be utilized to determine if clay is present in the formation.

17 Claims, 4 Drawing Figures

ELECTRICAL WELL LOGGING TOOL, HAVING AN EXPANDABLE SLEEVE, FOR DETERMINING IF CLAY IS PRESENT IN AN EARTH FORMATION

This invention relates to well logging. In a particular aspect, this invention relates to method and apparatus for increasing the resolution in electric well logging. In another particular aspect, this invention relates to method and apparatus for expanding the sides of the probe used in the well logging in such a manner that the electrodes located in the sides of the probe are in contact with the sides of the borehole to thereby increase the resolution in electric well logging. In another particular aspect, this invention relates to method and apparatus for determining if clay minerals are contributing to the resistivity of the formation under investigation. In another particular aspect, this invention relates to method and apparatus for reducing the effect of spontaneous potentials in electric well logging.

Electric well logging is a well known procedure for measuring the natural potentials or spontaneous potentials existing in the borehole, the resistivity of the formations surrounding the borehole, or the conductivity of the formations surrounding the borehole. The basic procedure utilized in electric well logging is to place a logging tool, commonly called a probe, at a known depth in the borehole. The logging tool has electrodes located in the sides thereof and these electrodes serve to both provide an electric current through the borehole fluids and adjacent layers of the surrounding earth formations and sense the voltage induced by the injected current. The voltage sensing electrodes are connected to a voltage measuring instrument adapted to indicate the value of the potential produced by the passage of the current from the current producing electrodes through the earth formation to the voltage sensing electrodes. This basic procedure can be utilized to measure the resistivity of the formations surrounding the borehole, the conductivity of the formations surrounding the borehole, or the natural potentials existing in the borehole.

One problem encountered in the past in electric well logging has been the effect of the drilling mud or other material in the borehole on the resistivity and conductivity measurements. Often the drilling mud or other material in the borehole will be highly conducting. If this drilling mud or other material is between the electrodes of the logging tool and the sides of the borehole, then the electric current injected into the formation will tend to at least partially flow through the drilling mud or other material in the borehole to the voltage sensing electrodes. This has the effect of decreasing the apparent resistivity of the formation surrounding the borehole, thus indicating that the formation has a greater porosity than is actually the fact. The effect of the drilling mud or other material in the borehole is thus to decrease the resolution or accuracy of the electric well logging.

Numerous attempts have been made to solve this problem in the past. One method is to simply use a well logging tool which has a diameter which is approximately the same as the diameter of the borehole. In this manner any drilling mud or other material in the borehole is displaced by the well logging tool and the electrodes in the well logging tool are substantially in contact with the walls of the borehole. This method solves the problem of interference caused by the drilling mud or other material in the borehole but creates other substantial problems in moving the well logging tool in the borehole. In addition the walls of a borehole are usually rough in nature and do not have a constant diameter extending for the depth of the borehole. It is thus not possible to use a probe which has a diameter substantially equal to the diameter of the borehole for the entire depth of the borehole.

Another method which has been developed is to utilize spring loaded electrodes which are constantly in contact with the walls of the borehole because of the pressure exerted by the springs. This method again solves the problem of removing the interference caused by the drilling mud or other material in the borehole but creates additional problems in moving the well logging tool in the borehole and also tends to wear electrodes badly because the electrodes are in constant contact with the rough wall of the borehole.

It is thus an object of this invention to provide method and apparatus for increasing the resolution or accuracy in electric well logging by removing the effects of the drilling mud or other material in the borehole on the electric well logging measurements. It is a second object of this invention to provide method and apparatus for expanding the sides of the probe used in the electric well logging in such a manner that the electrodes located in the sides of the probe are in contact with the sides of the borehole to thereby increase the resolution in electric well logging.

A second problem encountered in electric well logging is the effect of clay minerals on the resistivity and conductivity measurements. The conductivity or resistivity of sedimentary rocks is due to interstitial water and is of a different nature than that of the most common class of conductors, metals. In metals, the current flows as a result of the movement of charged particles called electrons. In other words, the current flow is electronic. In sedimentary rock, the current flows as a result of the movement of a different type of particle within the formation water called an ion, and the current flow is ionic.

The fact that the current flow in sedimentary rock is ionic is of great practical importance. Nearly all of the minerals present in the matrix of rocks are highly resistive or insulators. They will not allow current to flow in any appreciable quantities. It is due to the presence of conductive fluids in the pore spaces in the rock that current will flow through the rock. If the pore spaces are filled with nonconductive fluid, the effect is the same as when the rock is completely nonporous. Also, if there are pore spaces in the rock filled with conducting fluids, but the pore spaces are not connected, then the rock will not conduct current. Thus, before rock can conduct current or exhibit relatively low resistivity, it must have porosity and permeability and the pore spaces must contain some conductive fluid. An exception to this statement is shale, which has extremely low permeability, yet has low resistivity. This is because the clay particles in the shale, although good insulators when dry, are good conductors when wet.

It is extremely important that the presence of clay in a formation be recognized. If the presence of clay in the formation is not recognized, then a formation may be thought to have a high porosity and thus be oil or gas bearing strata when in fact the formation has a very low porosity because of the clay minerals present and is not an oil or gas bearing strata. It has been found that the contribution clay minerals make to the conductivity of a formation is related to the ionic exchange capacity of the formation which is commonly referred to as the cation exchange capacity. This capacity has in turn been related to the overvoltage or induced polarization effect. The induced polarization effect of a formation may be seen by turning off the current source. A voltage will continue to exist in the formation for a very brief period of time and the length of time for which the voltage continues to exist in the formation is referred to as the induced polarization effect.

In general, the induced polarization effect can be represented by the phase angle between the current injected into the formation and the voltage sensed by the voltage sensing electrodes of the well logging tool. It is thus an object of this invention to provide method and apparatus for measuring the phase angle between the current injected into the formation and the voltage sensed by the voltage sensing electrodes of the probe to determine if clay minerals are contributing to the resistivity of the formation under investigation.

A third problem encountered in electric well logging, particularly in the measurements of resistivity or conductivity, is caused by the spontaneous potentials which exist in the borehole. The self potentials which exist in the borehole are caused by the flow of current up and down the borehole through the materials in the borehole. This flow of current in the borehole is induced by the combination of shale, drilling mud, sandstone and other minerals in the formation and borehole. In the past, it has been common to orient the electrodes in the well logging tool on or parallel to the vertical axis of the well logging tool with the voltage sensing electrodes located on the top and bottom edges. This was done to increase the depth of the investigation into the formation because the water, which is conductive and gives an indication of the porosity of the formation, has been forced a short distance into the formation away from the borehole by the pressure of the drilling mud and other materials in the borehole. Because the self potential in the borehole varies as a function of the depth of the borehole, the self potential seen by the voltage sensing electrodes is different if the electrodes are oriented on or parallel to the vertical axis of the well logging tool. This difference in the self potential seen by the voltage sensing electrodes can cause errors in the resistivity or conductivity measurements in electric well logging. It is thus an object of this invention to provide method and apparatus for removing the effect of spontaneous potentials on the measurements of resistivity and conductivity in electric well logging.

In accordance with the present invention, method and apparatus is provided whereby the rigid body of the well logging tool or probe is enclosed in a sleeve of rubber or other suitable material which may be expanded and contracted by hydraulic or pneumatic means contained within the probe. Current and voltage electrodes are located around the circumference of the expandable sleeve. When the well logging tool is being moved in the borehole, the sleeve is in a retracted or nonexpanded state and the well logging tool can be easily moved to some desired position. Once the well logging tool has been placed at a desired depth in the borehole, the sleeve is expanded, thus placing the current and voltage electrodes located around the expandable sleeve in contact with the sides of the borehole. This has the effect of removing the interference caused by the drilling mud or other material in the borehole to the electric well logging measurements.

If clay is present in the formation, the clay will not be forced back from the borehole by the drilling mud or other material in the borehole. The clay will be present at the edge of the walls of the borehole. Thus, the required depth of investigation is reduced. Because of this factor, the distance between the voltage sensing electrodes need not be as great as when water is present in the formation. Therefore, the electrodes can be oriented in a plane normal to the vertical axis of the borehole. The relatively close spacing of the electrodes tends to limit the depth of the investigation but the depth of the investigation is sufficient to determine if clay is present in the formation. Since the electrodes lie normal to the vertical axis of the borehole, voltage offset due to spontaneous potentials in the borehole is minimal.

After the well logging tool has been placed at a desired depth in the borehole, alternating current is injected at the current electrodes. Voltage is sensed by the voltage sensing electrodes. A phase comparator circuit is utilized to measure the phase angle between the injected current and the sensed voltage and produce an output proportional to the magnitude of the induced polarization effect. The magnitude of the induced polarization effect gives a qualitative analysis of the clay content of the formation under examination.

Other objects and advantages of the invention will be apparent from the description of the invention and the appended claims as well as from the detailed description of the drawings in which:

The invention is described in terms of a preferred embodiment wherein an electric well logging operation is utilized to determine if clay is present in a formation. It should, however, be recognized that the expandable sleeve which surrounds the rigid body of the well logging tool is applicable to other electric well logging operations which can be performed with the probe in a stationary position and where it is desirable for the electrodes of the well logging tool or probe to be in contact with the sides of the borehole.

Figure 1:
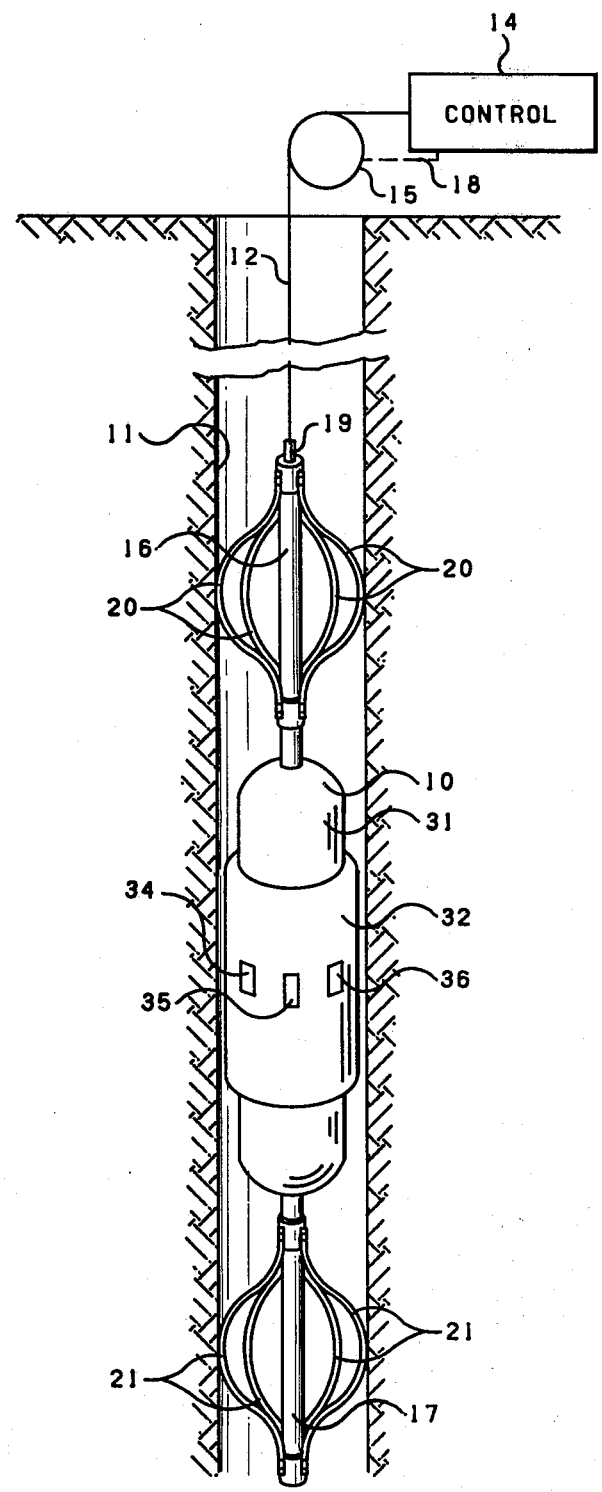
FIG. 1 is a representation of the well logging apparatus of this invention in an operative position with the sleeve which surrounds the well logging tool in an unexpanded position.

Referring now to the drawings and in particular to FIG. 1, there is illustrated an electric well logging tool 10 which is lowered into a borehole 11 by means of a cable 12. The depth to which the electric well logging tool 10 is lowered into the borehole 11 is controlled by control means 14. A depth sensing device 15 provides a signal 18 representative of the depth to which the probe has been lowered to the control means 14. The well logging tool 10 includes an elongated generally cylindrical hollow shell 31 which is enclosed in part by an expandable sleeve 32. The expandable sleeve may be formed of rubber or any other expandable material which can withstand the environmental conditions found in a borehole. Electrodes 34-36 are located in the expandable sleeve 32. The electrodes 34-36 are oriented in a plane perpendicular to the vertical axis of the well logging tool 10. In this preferred embodiment the electrodes 34-36 are separated by 40° spacings with respect to each other but the invention is not limited to this preferred spacing. The electrodes 34-36 are lead or an alloy of lead in this preferred embodiment and are embedded into the expandable sleeve 32 in such a manner that when the expandable sleeve 32 is in an expanded state, the electrodes 34-36 will be in contact with the sidewall surface of the borehole 11. In FIG. 1 the expandable sleeve 32 is shown in an unexpanded state such that the electrodes 34-36 are not in contact with the sidewall surface of the borehole 11. This allows the well logging tool 10 to be moved easily without physically wearing the electrodes 34-36.

The elongated, generally cylindrical, hollow shell 31 of the well logging tool 10 is attached at its upper end to a support 16 and at its lower end to a support 17. The upper end of the support 16 is in turn attached to cable 12 by a clamp 19. A plurality of flexible guide members 20 are attached to support 16 and extend outwardly therefrom to engage the wall of the borehole. Similar flexible guide members 21 are attached to support 17. Guide members 20 and 21 thereby perform the dual functions of orienting the electrode assembly 34-36 in the borehole and generally prevent rotation of the well logging tool 10.

Control signals from the control means 14 and data signals from the logging tool 10 are provided through electrical wires which form a part of the cable 12.

Figure 2:
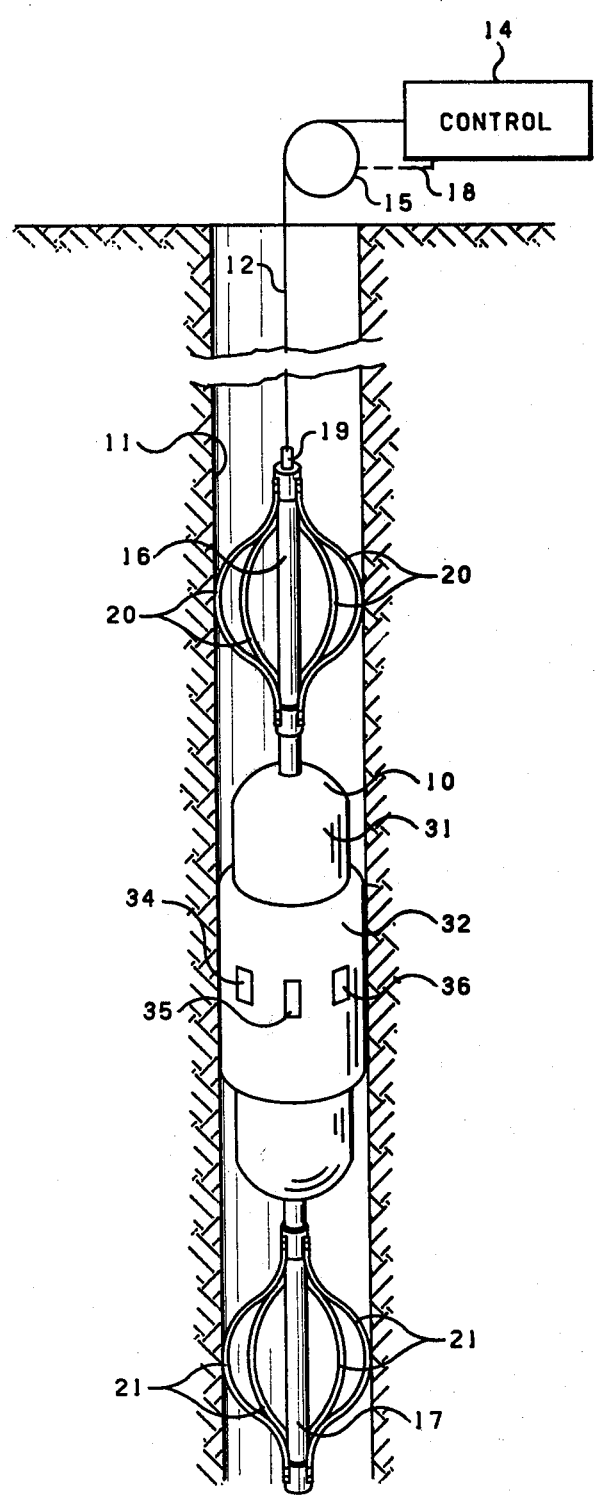
FIG. 2 is a representation of the well logging apparatus of this invention in an operative position with the sleeve which surrounds the well logging tool in an expanded position.

FIG. 2 is identical to FIG. 1 except that the expandable sleeve 32 is shown in an expanded state. In the expanded state the electrodes 34-36 will be in contact with the sidewall surface of the borehole 11 and any drilling mud or other material which is in the borehole 11 will have been displaced, thus allowing the electrodes 34-36 to be in good electrical contact with the sidewall surface of the borehole 11. In this manner the maximum electrical current can be injected into the formation and the resolution or accuracy of the electric well logging is increased.

Figure 3:
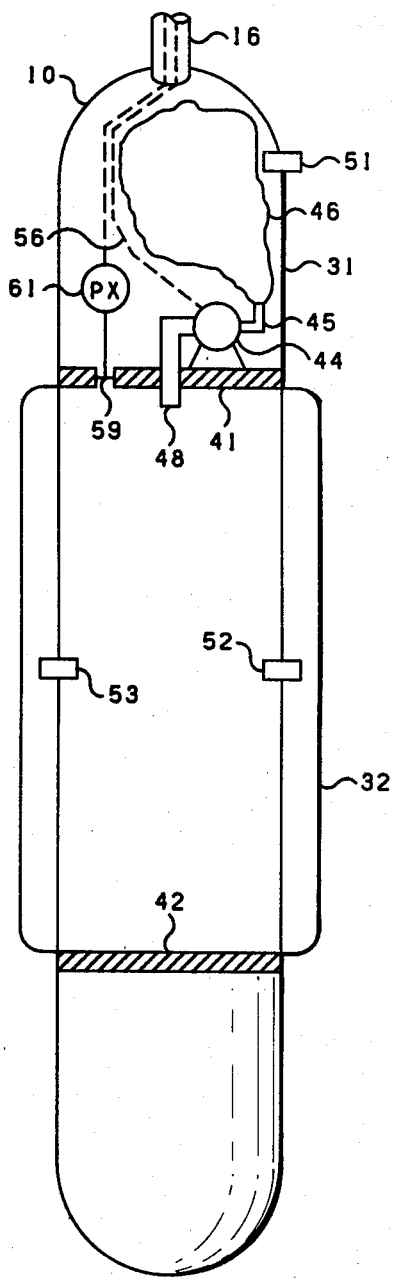
FIG. 3 is a cross sectional view of the well logging tool.

A cross sectional view of the logging tool 10 is shown in FIG. 3. The elongated generally cylindrical hollow shell 31 together with the expandable sleeve 32 which surrounds the hollow shell 31 is illustrated. Bulkheads 41 and 42 separate the central portion of the logging tool 10 from the outer portions of the logging tool 10. A reversible pumping means 44 is located on bulkhead 41. The reversible pumping means 44 has one port 45 which is tied to a collapsible bag 46. The second port 48 of the reversible pumping means 44 extends through the bulkhead 41 and opens into the central portion of the logging tool 10, which is surrounded by sleeve 32 in this preferred embodiment. An opening 51 is established in the upper end of the hollow cylinder 31 to allow the pressure seen inside the upper end of the hollow cylinder 31 to be equal to the pressure in the borehole. Openings 52 and 53 are provided in the hollow cylinder 31 to allow a fluid to be pumped into the expandable sleeve 32 to thereby expand the sleeve 32 which surrounds the central portion of the logging tool 10.

When the logging tool 10 has been placed at a desired position in the borehole 11, then a control signal 56 from the control means 14 illustrated in FIGS. 1 and 2 is supplied to the reversible pumping means 44. In response to the control signal 56, the reversible pumping means 44 will pump fluid from the collapsible bag 46 through conduit means 45 and 48 into the central portion of the logging tool 10. This fluid is supplied through openings 52 and 53 into the expandable sleeve 32 in such a manner that the expandable sleeve 32 is expanded so that the diameter of the expanded sleeve is substantially the same as the diameter of the borehole. In this preferred embodiment of the invention a fluid such as oil is utilized to expand the expandable sleeve 32 but it should be recognized that any other suitable substance could be utilized as the expanding fluid. Pressure sensor 59 senses the pressure of the expanding fluid in the inner portion of the logging tool 10. This pressure is transmitted from pressure transducer 61 to the control means 14 located at the surface. When the pressure in the central portion of the logging tool 10 has reached a desired pressure that will insure that the inflatable sleeve 32 is in contact with the sidewall surface of the drill hole 11, the reversible pumping means 44 is stopped in response to control signal 56 from control means 14. An operator simply watches the pressure indication supplied by pressure transducer 61 until a desired pressure is achieved and then cuts off the reversible pumping means 44 by means of control signal 56. When it is desired to return the expandable sleeve 32 to a nonexpanded condition, the pumping action of the reversible pumping means 44 is simply reversed by means of control signal 56 and the oil is pumped back into the collapsible bag 46. The operator watches the pressure indication supplied by pressure transducer 61 until a pressure which indicates that the expandable sleeve has been returned to a nonexpanded condition is achieved. At that time the reversible pumping means 44 is stopped by means of control signal 56. The logging tool 10 can then be moved to another position and the above described procedure repeated as often as is required to obtain the necessary data to complete the electric well logging operation.

Although the control of the reversible pumping means 44 has been described in terms of control by an operator, control could also be automatic. An operator would simply initiate the pumping sequence and automatic control using a pressure controller and a set point could carry out the previously described operation.

Figure 4:
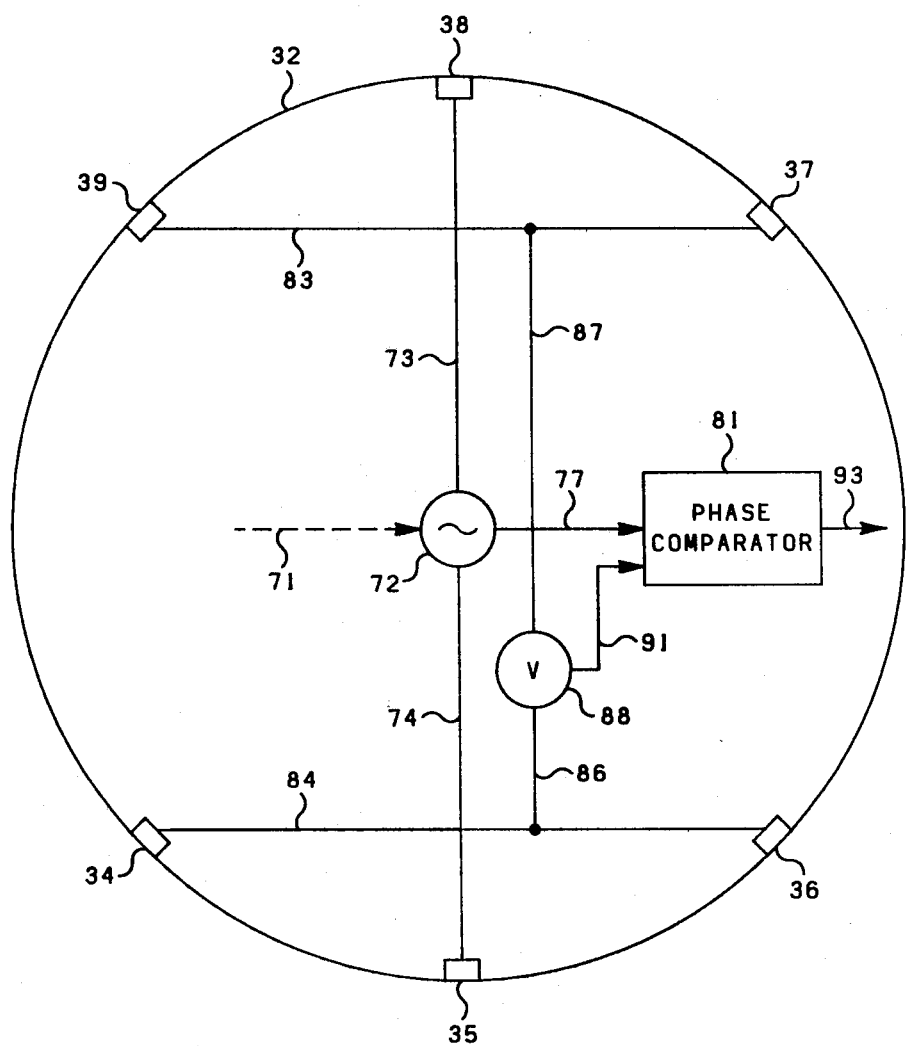
FIG. 4 is a schematic representation of the electrodes of the well logging tool and the phase comparator circuit.

The electrodes located in the expandable sleeve 32 are illustrated in FIG. 4. Current is injected from electrodes 35 and 38 which are located on opposite sides of the logging tool 10. The voltage induced in the rock formation is sensed by electrodes 34, 36, 37 and 39 which are spaced 90° apart from each other. Four voltage sensing electrodes are utilized to provide symmetry and an averaging effect to the measurement of the voltage induced in the rock formation by the current injected at electrodes 35 and 38. The current electrodes 35 and 38 are spaced 45° from any voltage electrode 34, 36, 37 and 38.

In response to the control signal 71 from control means 14, an alternating current is generated by current generating means 72 and is injected by electrical conducting means 73 and 74 and electrodes 35 and 38 into the rock formation surrounding the borehole. The current generating means 72 may be located on the surface or may be located in the logging tool. The current injected into the formation is also supplied as one input to the phase comparator 81 by means of signal 77 from the current generating means 72. The voltage sensing electrodes 37 and 39 are tied together by electrical conducting means 83. The voltage sensing electrodes 34 and 36 are tied together by electrical conducting means 84. The voltage sensing device 88 is tied to electrical conducting means 83 by means of electrical conducting means 87 and is also tied to electrical conducting means 84 by electrical conducting means 86. The voltage sensing device 88 senses the voltage between voltage sensing electrodes 36 and 37 which is the same as the voltage between voltage sensing electrodes 34 and 39 and supplies signal 91, representative of the voltage between voltage sensing electrodes 36 and 37, as a second input to the phase comparator 81. The phase comparator circuit 81 measures the phase angle between the current injected into the formation and the voltage sensed in response to the current injected to the formation and produces an output signal 93 which is proportional to the magnitude of the induced polarization effect. Signal 93 is supplied to control means 14 where a determination is made as to whether or not clay is present in the formation based on the magnitude of signal 93 from the phase comparator circuit 81. If no phase shift is present between the current injected into the formation and the voltage sensed in response to the current injected into the formation, then no clay is present in the formation. As the amount of clay in the formation increases, the phase shift or induced polarization effect will increase and a quantitative determination of the amount of clay in the formation can thus be made. Once the presence of clay is established, then it can be easily recognized that the measured porosity of the rock formation is in error and corrections can be made.

While the invention has been described in terms of the presently preferred embodiments as shown in FIGS. 1-4, reasonable variations and modifications are possible by those skilled in the art, within the scope of the described invention and the appended claims. Variations such as the number of electrodes used, the orientation of the electrodes, the physical configuration of the well logging tool, and different means for inflating the sleeve are within the scope of the described invention.

That which is claimed is:

1. Well logging apparatus comprising:
   a well logging tool having a rigid body, said rigid body being enclosed at least in part by an expandable sleeve;
   a plurality of electrodes;
   means for mounting said plurality of electrodes on said expandable sleeve;
   means for expanding said sleeve in such a manner so as to place said plurality of electrodes in close electrical contact with the sidewall surface of the borehole which is being logged;
   a control means;
   means for establishing a first signal representative of the pressure in said expandable sleeve;
   means for transmitting said first signal to said control means, said control means generating a first control signal to activate said means for expanding said sleeve to pump fluid into said expandable sleeve when it is desired to expand said expandable sleeve, said control means generating a second control signal to stop said means for expanding said sleeve when said first signal indicates that the pressure in said expandable sleeve has reached a desired value, said control means generating a third control signal to reverse the pumping action of said means for expanding said sleeve to return said expandable sleeve to a nonexpanded state when it is desired to move said logging tool, and said control means generating a fourth control signal to stop said means for expanding said sleeve when said first signal indicates that said expandable sleeve has returned to a nonexpanded state.

2. Apparatus in accordance with claim 1 wherein said expandable sleeve is rubber.

3. Apparatus in accordance with claim 1 wherein said rigid body of said well logging tool is divided into upper, central and lower sections, said upper, central and lower sections being oriented on the vertical axis of said well logging tool with said upper section of said rigid body of said well logging tool being the closest to the earth's surface when said well logging tool is placed in said borehole, said expandable sleeve at least partially surrounding at least a portion of said central section of said rigid body of said well logging tool.

4. Apparatus in accordance with claim 3 additionally comprising:
   means for sealing said upper section from said central section; and
   means for sealing said central section from said lower section.

5. Apparatus in accordance with claim 4 wherein said upper section of said rigid body of said well logging tool has at least one opening to said borehole, said central section of said rigid body of said well logging tool has at least one opening to said expandable sleeve, and said means for expanding said sleeve, which is located in said upper section, has at least one opening into said central section of said rigid body through said seal between said central section and said upper section.

6. Apparatus in accordance with claim 5 wherein said means for expanding said sleeve is a reversible pumping means.

7. Apparatus in accordance with claim 6 wherein said means for establishing a first signal representative of the pressure in said expandable sleeve comprises
   means for sensing the pressure in said central section of said rigid body of said logging tool, said pressure in said central section being substantially equal to the pressure seen by said expandable sleeve.

8. Apparatus in accordance with claim 1 wherein said plurality of electrodes are oriented in a plane which is perpendicular to the vertical axis of said well logging tool.

9. Apparatus in accordance with claim 1, wherein said plurality of electrodes comprises two current electrodes and four voltage electrodes, additionally comprising:
   means for injecting alternating electrical current through said two current electrodes into the formation surrounding said borehole;
   means for sensing the voltage seen by said four voltage electrodes, said voltage being induced in said formation surrounding said borehole by the thus injected alternating electrical current;
   phase comparator means;
   means for supplying said alternating electrical current to one input of said phase comparator means; and means for supplying said voltage to a second input of said phase comparator means, said phase comparator means determining the phase shift between said alternating electric current and said voltage to give an indication of the presence of clay minerals in said formation surrounding said borehole, said two current electrodes and said four voltage electrodes being oriented in a plane which is perpendicular to the vertical axis of said well logging tool to thereby substantially reduce the effect of spontaneous potentials on the determination of said phase shift, said two current electrodes being located on opposite sides of said expandable sleeve, two of said four voltage electrodes being located on opposite sides of and equally spaced from a first one of said two current electrodes, the remaining two of said four voltage electrodes being located on opposite sides of and equally spaced from the second one of said two current electrodes, said four voltage electrodes providing symmetry and an averaging effect to the measurement of said voltage being induced in said formation.

10. Apparatus in accordance with claim 9 wherein said four voltage electrodes are located 90° apart, with respect to each other, on said expandable sleeve, and said two current electrodes are located 45° from any one voltage electrode.

11. In a well logging tool having two current electrodes and four voltage electrodes located therein, apparatus comprising:
 means for injecting alternating electrical current through said two current electrodes into the formation surrounding the borehole into which said logging tool is placed;
 means for sensing the voltage seen by said four voltage electrodes, said voltage being induced in said formation surrounding said borehole by said injected alternating electrical current;
 phase comparator means;
 means for supplying said alternating electrical current to one input of said phase comparator means;
 means for supplying said voltage to a second input of said phase comparator means, said phase comparator means determining the phase shift between said alternating electrical current and said voltage to give an indication of the presence of clay minerals in said formation surrounding said borehole, said two current electrodes and said four voltage electrodes being oriented in a plane which is perpendicular to the vertical axis of said well logging tool to thereby substantially reduce the effect of spontaneous potentials on the determination of said phase shift, said two current electrodes being located on opposite sides of said well logging tool, two of said four voltage electrodes being located on opposite sides of and equally spaced from a first one of said two current electrodes, the remaining two of said four voltage electrodes being located on opposite sides of and equally spaced from the second one of said two current electrodes, said four voltage electrodes providing symmetry and an averaging effect to the measurement of said voltage being induced in said formation.

12. Apparatus in accordance with claim 11 wherein said four voltage electrodes are located 90° apart, with respect to each other, on said logging tool, and said two current electrodes are located 45° from any one voltage electrode.

13. A method of well logging comprising the steps of:
 lowering a well logging tool into a borehole, said well logging tool having an expandable sleeve associated therewith, said expandable sleeve having a plurality of electrodes mounted thereon;
 sensing the pressure seen by said expandable sleeve and generating a first signal representative thereof;
 pumping fluid into said expandable sleeve when it is desired to expand said expandable sleeve;
 stopping the pumping of fluid into said expandable sleeve when said first signal indicates that the pressure seen by said expandable sleeve is sufficient to insure that said plurality of electrodes are in close electrical contact with the sidewall surface of said borehole;
 pumping fluid out of said expandable sleeve when it is desired to move said well logging tool; and
 stopping the pumping of fluid out of said expandable sleeve when said first signal indicates that the pressure seen by said expandable sleeve is sufficient to insure that said expandable sleeve has returned to an at least partially unexpanded state.

14. A method in accordance with claim 13, wherein said plurality of electrodes comprises two current electrodes and four voltage electrodes, additionally comprising the steps of:
 injecting alternating electrical current through said two current electrodes into the formation surrounding said borehole;
 sensing the voltage seen by said two voltage electrodes, said voltage being induced in said formation surrounding said borehole by the thus injected alternating electrical current; and
 determining the phase shift between said alternating electrical current and said voltage to give an indication of the presence of clay minerals in said formations surrounding said borehole, said two current electrodes and said four voltage electrodes being oriented in a plane which is perpendicular to the vertical axis of said well logging tool to thereby substantially reduce the effect of spontaneous potentials on the determination of said phase shift, said two current electrodes being located on opposite sides of said expandable sleeve, two of said four voltage electrodes being located on opposite sides of and equally spaced from a first one of said two current electrodes, the remaining two of said four voltage electrodes being located on opposite sides of and equally spaced from the second one of said two current electrodes, said four voltage electrodes providing symmetry and an averaging effect to the measurement of said voltage being induced in said formation.

15. A method in accordance with claim 14 wherein said four voltage electrodes are located 90 degrees apart, with respect to each other, on said expandable sleeve, and said two current electrodes are located 45 degrees from any one voltage electrode.

16. A method of well logging comprising the steps of:
 lowering a well logging tool, having two current electrodes and four voltage electrodes located therein, to a desired depth in a borehole;
 injecting alternating current through said two current electrodes into the formation surrounding the borehole into which said logging tool is placed;
 sensing the voltage seen by said four voltage electrodes, said voltage being induced in said formation surrounding said borehole by said injected alternating electrical current; and
 determining the phase shift between said alternating electrical current and said voltage to give an indication of the presence of clay minerals in said formation surrounding said borehole, said two current electrodes and said four voltage electrodes being oriented in a plane which is perpendicular to the vertical axis of said well logging tool to thereby substantially reduce the effect of spontaneous potentials on the determination of said phase shift, said two current electrodes being located on opposite sides of said well logging tool, two of said four voltage electrodes being located on opposite sides of and equally spaced from a first one of said two current electrodes, the remaining two of said four voltage electrodes being located on opposite sides of and equally spaced from the second one of said two current electrodes, said four voltage electrodes providing symmetry and an averaging effect to the measurement of said voltage being induced in said formation.

17. A method in accordance with claim 16 wherein said four voltage electrodes are located 90 degrees apart, with respect to each other, on said expandable sleeve, and said two current electrodes are located 45 degrees from any one voltage electrode.

* * * * *